United States Patent
Nagata et al.

(10) Patent No.: US 6,807,142 B1
(45) Date of Patent: Oct. 19, 2004

(54) OPTICAL INFORMATION RECORDING MEDIUM AND METHOD FOR INITIALIZING THE SAME

(75) Inventors: Ken'ichi Nagata, Hyogo (JP); Kenichi Nishiuchi, Osaka (JP); Noboru Yamada, Osaka (JP); Katsumi Kawahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 596 days.

(21) Appl. No.: 09/786,700

(22) PCT Filed: Jul. 11, 2000

(86) PCT No.: PCT/JP00/04635
§ 371 (c)(1), (2), (4) Date: May 25, 2001

(87) PCT Pub. No.: WO01/04888
PCT Pub. Date: Jan. 18, 2001

(30) Foreign Application Priority Data

Jul. 12, 1999 (JP) .......................................... 11-197575
Sep. 14, 1999 (JP) .......................................... 11-261072

(51) Int. Cl.$^7$ ................................................ G11B 7/24
(52) U.S. Cl. ..................................... 369/275.2; 369/94
(58) Field of Search ............................... 369/94, 275.3, 369/275.4, 275.2, 47.28, 47.55, 47.5, 47.52, 116, 59.11, 59.12, 53.37, 100; 248/64.4; 430/270.13

(56) References Cited

U.S. PATENT DOCUMENTS 5,684,778 A * 11/1997 Yamada et al. ............. 369/100
5,768,221 A * 6/1998 Kasami et al. ................ 369/94
5,914,926 A * 6/1999 Maeno et al. ............ 369/53.35
6,151,293 A * 11/2000 Aoki et al. .................. 369/286
6,456,584 B1 * 9/2002 Nagata et al. ........... 369/275.2
6,507,559 B1 * 1/2003 Iwaki ...................... 369/275.5
6,514,591 B1 * 2/2003 Nagata et al. ............. 428/64.4
6,554,972 B1 * 4/2003 Ichihara et al. ........ 430/270.13

FOREIGN PATENT DOCUMENTS

| JP | 62-250533 | 10/1987 |
| JP | 3-35424 | 2/1991 |
| JP | 4-78033 | 3/1992 |
| JP | 4-281219 | 10/1992 |
| JP | 9-22542 | 1/1997 |
| JP | 9-50649 | 2/1997 |
| JP | 9-161337 | 6/1997 |

* cited by examiner

Primary Examiner—Thang V. Tran
(74) Attorney, Agent, or Firm—Merchant & Gould P.C.

(57) ABSTRACT

An optical information recording medium including a first and second information layers is provided with an area where only the first information layer, which is provided nearer a substrate, exists, and initialization using a laser beam is started from this area. In an area where the second information layer exists, the first information layer is initialized after the second information layer is initialized. Alternatively, the first and second information layers are initialized at the same time by a flash light with adjusted emission time, emission energy, and the like. The first information layer is initialized after the second information layer is initialized by radiating a plurality of flash lights.

23 Claims, 13 Drawing Sheets

OPTICAL INFORMATION RECORDING MEDIUM AND METHOD FOR INITIALIZING THE SAME

TECHNICAL FIELD

The present invention relates to an optical information recording medium for recording and reproducing information with a large capacity using a laser beam and a method for initializing the same.

BACKGROUND ART

Examples of an optical information recording medium capable of recording and reproducing signals using a laser beam include a phase change type optical disk, a magneto-optical disk, and an optical disk using a dye material. In a recordable/erasable phase change type optical disk, a chalcogenide typically is used as a recording layer material. Generally, the crystalline state of the recording layer material is used as a non-recorded state. Signals are recorded by irradiating the recording layer material with a laser beam so as to melt and quench the recording layer material so that the material becomes amorphous. On the other hand, in order to erase signals, the recording layer is irradiated with a laser beam at a power lower than that for recording so that the recording layer becomes crystalline. Further, in order to reproduce recorded signals, the recording layer is irradiated with a laser beam at a power that does not cause the phase change of the material.

The recording layer made of a chalcogenide is formed in the amorphous state. Therefore, it is necessary to entirely crystallize a recording region beforehand to obtain a non-recorded state. Such entire crystallization of the recording region is called initialization. In general, the initialization process is incorporated in the disk production process and carried out using a laser beam source or a flash light source.

A recording medium with a so-called one-face-double layer structure has been proposed for the purpose of increasing the recording capacity of a recordable or a recordable/erasable phase change type optical disk. An optical disk with this one-face-double layer structure includes two information layers (multilayered films including recording layers) formed on a substrate. Signals are recorded or erased by a laser beam radiated through the substrate (i.e., radiated from the same direction).

In the phase change type optical disk with the one-face-double layer structure, when a first information layer on the side near the laser beam incident surface (i.e., the side near the substrate) is designed to have a "Hi to Lo structure" (H-L structure) in which a reflectance of the layer is decreased by recording (formation of an amorphous mark), and a second information layer distant from the laser beam incident surface (i.e., distant from the substrate) is designed to have a "Lo to Hi structure" (L-H structure) in which a reflectance of the layer is increased by recording (formation of an amorphous mark), the disk can serve as an optical information recording medium in which recording sensitivities of the first and second information layers and levels of the signals reproduced from these layers are uniform.

In the initialization process for the phase change type optical information recording medium with the one-face-double layer structure, what is important is whether stable focus control of the laser beam for initializing respective information layers is possible or not. However, in the medium including the first information layer with the H-L structure and the second a information layer with the L-H structure as described above, the second information layer presents a higher reflectance when the recording layer contained therein is amorphous than when it is crystalline, while the first information layer presents a lower reflectance when the recording layer contained therein is amorphous than when it is crystalline. Quantities of laser beams reflected from the first and second information layers are thus ill-balanced. Hence, when the recording layers in the recording region are entirely crystallized, it is difficult to obtain focus error signals from the first information layer while they are easily obtained from the second information layer.

With regard to initialization using a flash light source, the method conducted for a medium including a single information layer is already known (JP 62(1987)-250533 A). When the flash light source is used, the medium can be initialized in a shorter time period as compared with the case where a laser beam source is used.

However, in the optical information recording medium with a one-face-double layer structure, an attempt has never been made to initialize two information layers by a flash light radiated from the same direction. Unlike a laser beam, a focus of the flash light cannot be controlled. Furthermore, when the flash light is radiated from the substrate side for example, the second information layer has to be initialized by the light transmitted through the first information layer. In addition, different conditions should be adapted for initializing the first and second information layers because these layers generally have different structures in consideration of the fact that information signals are recorded/reproduced thereon/therefrom by the laser beam radiated from the same direction.

Therefore, in general, it is considered that the initialization using a laser beam is more appropriate for initializing the optical information recording medium with a one-face-double layer structure. However, initialization of the optical information recording medium with a one-face-double layer structure using the laser beam radiated from the same direction brings about some problems that do not occur in the case of the medium with a single layer structure.

DISCLOSURE OF INVENTION

An object of the present invention is to provide an initialization method suitable for an optical information recording medium with a one-face-double layer structure. It is another object of the present invention to provide a new optical information recording medium suitable for this initialization method.

In order to achieve the above-mentioned objects, the first optical information recording medium according to the present invention includes a substrate and at least a first information layer and a second information layer, and the first information layer and the second information layer, on/from which signals can be recorded/reproduced, are formed on the substrate in this order. The first optical information recording medium is characterized in that an area where the first information layer exists and the second information layer does not exist is provided on the substrate.

In the above-mentioned optical information recording medium, it is preferable that the substrate has a disk shape and the area where the first information layer exists and the second information layer does not exist is provided at least at one portion selected from an outermost circumference portion and an innermost circumference portion of an area where the first information layer exists. Furthermore, it is preferable that the first information layer includes a first recording layer and the second information layer includes a second recording layer, and the first and second recording layers are formed of a material that changes reversibly between an amorphous state and a crystalline state by irradiation of a laser beam from a side of the substrate.

In the above-mentioned optical information recording medium, with respect to a laser beam having a wavelength of $\lambda_0$ radiated from the side of the substrate for reproducing signals recorded on the first and second recording layers, a reflectance $R_0$ (1amo) of the first information layer when the first recording layer is in an amorphous state, a reflectance $R_0$(1cry) of the first information layer when the first recording layer is in a crystalline state, a reflectance $R_0$(2amo) of the second information layer when the second recording layer is in an amorphous state, and a reflectance $R_0$(2cry) of the second information layer when the second recording layer is in a crystalline state preferably satisfy the relationships:

$$R_0(1amo) < R_0(1cry), \text{ and } R_0(2amo) > R_0(2cry).$$

Further, in order to achieve the above-mentioned objects, the first method for initializing an optical information recording medium according to the present invention initializes an optical information recording medium by radiating a laser beam, the recording medium including a substrate and at least a first information layer and a second information layer, the first information layer and the second information layer, on/from which signals can be recorded/reproduced, being formed on the substrate in this order, wherein an area where the first information layer exists and the second information layer does not exist is provided on the substrate, the laser beam being irradiated from a side of the substrate. The first initialization method is characterized in that initialization of the first information layer is started from the area.

In the above-mentioned first initialization method, with respect to a laser beam having a wavelength of $\lambda_1$ for initializing the first information layer, a reflectance $R_1$(1before) of the first information layer before being initialized, a reflectance $R_1$(1after) of the first information layer after being initialized, a reflectance $R_1$(2before) of the second information layer before being initialized, a reflectance $R_1$(2after) of the second information layer after being initialized, and a transmittance $T_1$(1before) of the first information layer before being initialized preferably satisfy the relationships:

$$R_1(1before) < R_1(1after), R_1(1before) < R_1(2before) \times [T_1(1before)]^2,$$
$$\text{and } R_1(1before) < R_1(2after) \times [T_1(1before)]^2.$$

Furthermore, in order to achieve the above-mentioned objects, the second method for initializing an optical information recording medium according to the present invention initializes an optical information recording medium by radiating a laser beam, the recording medium including a substrate and at least a first information layer and a second information layer, the first information layer and the second information layer, on/from which signals can be recorded/reproduced, being formed on the substrate in this order, the laser beam being radiated from a side of the substrate. The second initialization method is characterized in that, at least in an area where both the first and second information layers are formed, the first information layer is initialized after the second information layer is initialized.

In the above-mentioned second initialization method, with respect to a laser beam having a wavelength of $\lambda_2$ for initializing the second information layer, a transmittance $T_2$(1before) of the first information layer before being initialized and a transmittance $T_2$(1after) of the first information layer after being initialized preferably satisfy the relationship:

$$T_2(1before) > T_2(1after).$$

In the above-mentioned second initialization method, with respect to a laser beam having a wavelength of $\lambda_1$ for initializing the first information layer, a reflectance $R_1$(1before) of the first information layer before being initialized, a reflectance $R_1$(2before) of the second information layer before being initialized, a reflectance $R_1$(2after) of the second information layer after being initialized, and a transmittance $T_1$(1before) of the first information layer before being initialized; and, with respect to a laser beam having a wavelength of $\lambda_2$ for initializing the second information layer, a reflectance $R_2$(1before) of the first information layer before being initialized, a reflectance $R_2$(2before) of the second information layer before being initialized, and a transmittance $T_2$(1before) of the first information layer before being initialized, preferably satisfy the relationships:

$$R_1(1before) < R_1(2before) \times [T_1(1before)]^2, R_1(2before) > R_1(2after),$$
$$\text{and } R_2(1before) < R_2(2before) \times [T_2(1before)]^2.$$

In the above-mentioned second initialization method, it is preferable that the wavelength $\lambda_1$ of the laser beam for initializing the first information layer is equal to the wavelength $\lambda_2$ of the laser beam for initializing the second information layer.

Still further, in order to achieve the above-mentioned objects, the third method for initializing an optical information recording medium according to the present invention initializes an optical information recording medium by radiating a laser beam, the recording medium including a substrate and at least a first information layer and a second information layer, the first information layer and the second information layer, on/from which signals can be recorded/reproduced, being formed on the substrate in this order, wherein an area where the first information layer exists and the second information layer does not exist is provided on the substrate, the laser beam being radiated from a side of the substrate. The third initialization method is characterized in that initialization of the first information layer is started from the area, and the first information layer is initialized after the second information layer is initialized at least in an area where both the first and second information layer are formed.

In the above-mentioned third initialization method, with respect to a laser beam having a wavelength of $\lambda_1$ for initializing the first information layer, a reflectance $R_1$(1before) of the first information layer before being initialized, a reflectance $R_1$(1after) of the first information layer after being initialized, a reflectance $R_1$(2before) of the second information layer before being initialized, a reflectance $R_1$(2after) of the second information layer after being initialized, and a transmittance $T_1$(1before) of the first information layer before being initialized; and, with respect to a laser beam having a wavelength of $\lambda_2$ for initializing the second information layer, a transmittance $T_2$(1before) of the first information layer before being initialized and a transmittance $T_2$(1after) of the first information layer after being initialized, preferably satisfy the relationships:

$$R_1(1before) < R_1(1after), R_1(1before) < R_1(2before) \times [T_1(1before)]^2,$$
$$R_1(1before) < R_1(2after) \times [T_1(1before)]^2, \text{ and}$$
$$T_2(1before) > T_2(1after).$$

In the above-mentioned third initialization method, with respect to a laser beam having a wavelength of $\lambda_1$ for initializing the first information layer, a reflectance $R_1(1\text{before})$ of the first information layer before being initialized, a reflectance $R_1(1\text{after})$ of the first information layer after being initialized, a reflectance $R_1(2\text{before})$ of the second information layer before being initialized, a reflectance $R_1(2\text{after})$ of the second information layer after being initialized, and a transmittance $T_1(1\text{before})$ of the first information layer before being initialized; and, with respect to a laser beam having a wavelength of $\lambda_2$ for initializing the second information layer, a reflectance $R_2(1\text{before})$ of the first information layer before being initialized, a reflectance $R_2(2\text{before})$ of the second information layer before being initialized, and a transmittance $T_2(1\text{before})$ of the first information layer before being initialized, preferably satisfy the relationships:

$$R_1(1\text{before}) < R_1(1\text{after}),\ R_1(1\text{before}) < R_1(2\text{before}) \times [T_1(1\text{before})]^2,$$
$$R_1(1\text{before}) < R_1(2\text{after}) \times [T_1(1\text{before})]^2,\ R_1(2\text{before}) > R_1(2\text{after}),$$
$$\text{and } R_2(1\text{before}) < R_2(2\text{before}) \times [T_2(1\text{before})]^2.$$

Also in the above-mentioned third initialization method, it is preferable that the wavelength $\lambda_1$ of the laser beam for initializing the first information layer is equal to the wavelength $\lambda_2$ of the laser beam for initializing the second information layer.

The present invention also provides an initialization method using a flash light. That is, the fourth method for initializing an optical information recording medium according to the present invention initializes an optical information recording medium, the recording medium including a substrate and at least a first information layer and a second information layer, the first information layer and the second information layer, on/from which signals can be recorded/reproduced, being formed on the substrate in this order, and the method is characterized in that the first and second information layers are initialized by at least one flash light radiated from a light source provided on the side of the substrate.

In the above-mentioned fourth initialization method, it is preferable that the first and second information layers are initialized at the same time by a flash light with an emission time of not more than 200 µs (µsecond) radiated once.

In this case, it is preferable that the first and second information layers are initialized at the same time by a flash light radiated once from a light source with emission energy of not less than 1.5 J/cm² and not more than 1.8 J/Cm² arranged at a distance of not less than 5 mm and less than 15mm from the optical information recording medium. Additionally, it is preferable that the flash light passes through the first information layer at a transmittance of not less than 40% and not more than 70% .

In the above-mentioned fourth initialization method, a plurality of flash lights may be radiated.

In this case, it is preferable that at least two flash lights that are different in emission energy are radiated. Further, it is preferable that the second information layer is initialized by a first flash light, and then the first information layer is initialized by a second flash light with emission energy lower than that of the first flash light. The above-mentioned method including a plurality of times of flash light irradiation is suitable for a disk-shaped optical information recording medium having a radius of not less than 50 mm.

BEST MODE FOR CARRYING OUT THE INVENTION

Hereinafter, the present invention will be described by way of an embodiment with reference to the drawings.

Figure 1:
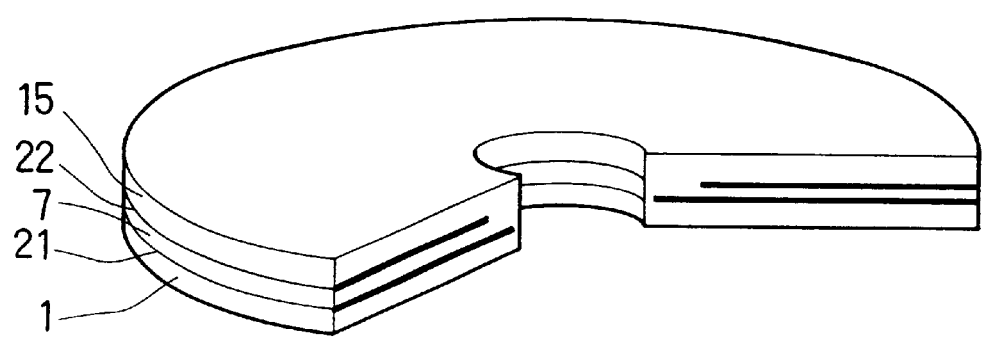
FIG. 1 is a partially cutaway perspective view showing an embodiment of an optical information recording medium of the present invention.
Figure 2:
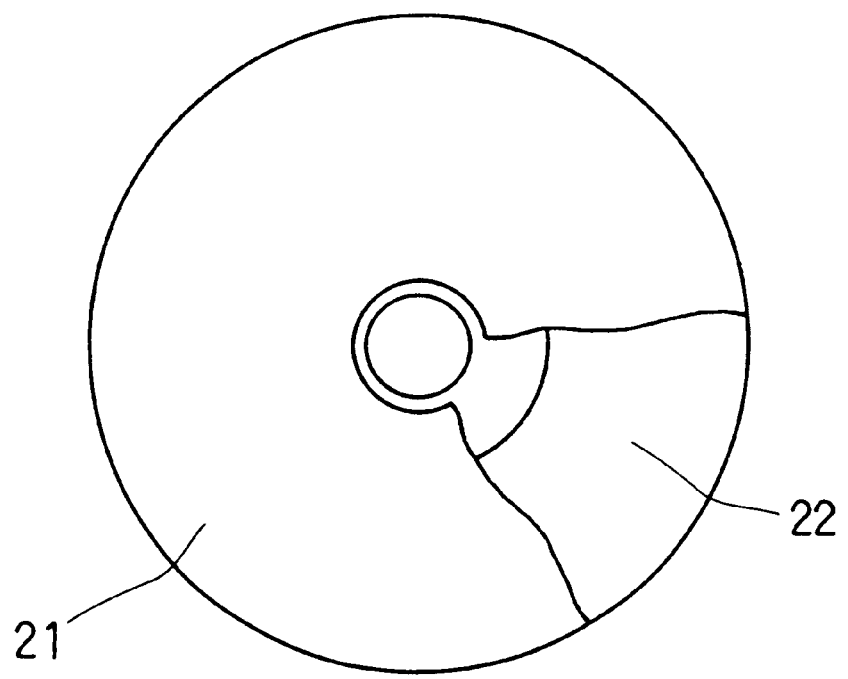
FIG. 2 is a partially cutaway plan view showing the embodiment of an optical information recording medium of the present invention.
Figure 3:
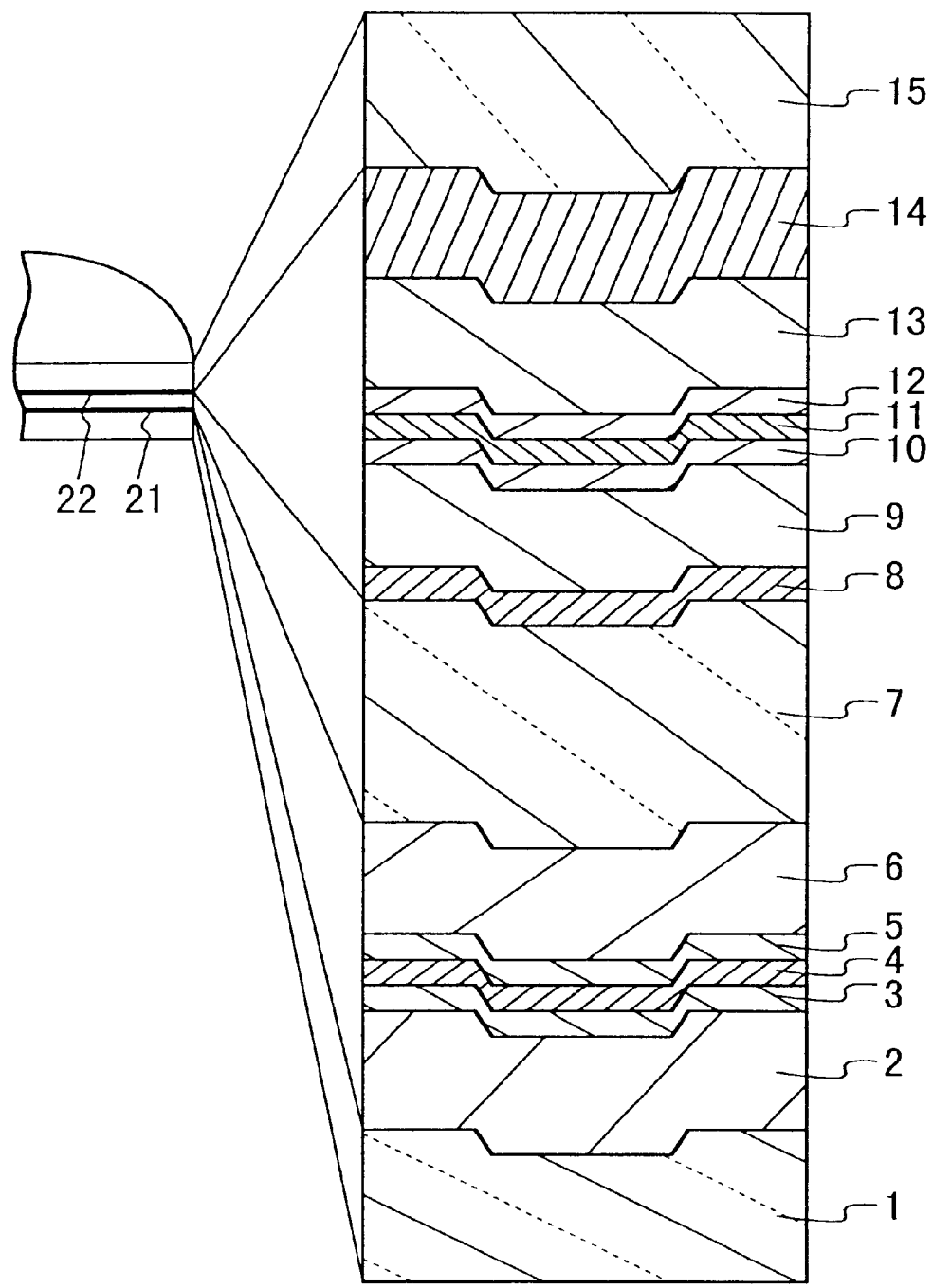
FIG. 3 is a partial cross-sectional view showing the embodiment of an optical information recording medium of the present invention.

FIGS. 1 to 3 show an optical information recording medium (optical disk) according to one embodiment of the present invention. FIG. 1 is a partially cutaway perspective view of the optical disk, FIG. 2 is a partially cutaway plan view of the same, and FIG. 3 is a cross-sectional view of the same. FIG. 2 is the plan view showing the optical disk as viewed from the side of a substrate 1. This optical disk is a phase change type optical disk with a one-face-double layer structure. The optical disk includes two information layers (a first information layer 21 and a second information layer 22) and each information layer includes one recording layer (a first recording layer 4, a second information layer 11). Laser beams used for recording/reproducing signals on/from each information layer and so on, and further for initializing each information layer come into the optical disk from the side of the substrate 1.

The substrate 1 preferably is formed of a resin sheet such as polycarbonate or PMMA or a transparent material such as a glass sheet. The substrate may be formed of an ultraviolet curable resin. A surface of the substrate preferably is covered with a spiral or concentric circular continuous groove (guide groove, track). Further, the substrate 1 may be formed by spin-coating. In this case, for example, the second information layer 22 is formed on a protective substrate 15, and then an optically separating layer 7 whose surface is covered with continuous grooves is formed by a 2P method. On top of that, the first information layer 21 is formed, and then a resin is applied to the first information layer by spin-coating. The substrate 1 is thus obtained. In the case where the substrate 1 is formed by spin-coating, the thickness of the substrate is generally not more than several tens of micrometer.

For protective layers 2, 6, 9, and 13, it is preferable to use a physically and chemically stable material that has a higher melting point and softening point than the melting point of a material used for the first recording layer 4 and the second recording layer 11, and does not form a solid solution with the material used for the recording layers. Examples of such a material include a dielectric such as $Al_2O_3$, $SiO_2$, $Ta_2O_5$, $MoO_3$, $WO_3$, $ZrO_2$, ZnS, AlN, BN, $Si_3N_4$, TiN, ZrN, $PbF_2$, and $MgF_2$, and a suitable combination of these dielectrics. It should be noted that elements contained in the material recited above may be outside of the stoichiometric ratio. The material used for the protective layers is not necessarily a dielectric or transparent. For example, ZnTe or the like, which has an optical absorptivity with respect to visible light and infrared rays, may be used. A pair of protective layers in each information layer 21, 22 may be formed of the same material. However, when the pair of protective layers are formed of different materials, there is an advantage in that the freedom degree in the thermal and optical disk design increases.

For interface layers 3, 5, 10, and 12, it is preferable to use a material represented by a general formula: X—N, X—O—N, or X—C, or a mixture thereof. Although X is not particularly limited, X preferably is at least one element selected from the group consisting of Ge, Cr, Si, Al, and Te. Further, it is preferable that nitrogen is contained in the interface layers. The interface layers are not necessarily provided. However, if the interface layers are provided, mutual diffusion between the elements constituting the recording layers 4 and 11 and the elements constituting the protective layers 2, 6, 9, and 13 is suppressed so as to improve the repetition characteristics for recording and erasure.

The recording layers 4 and 11 can be formed of a material that changes reversibly between the amorphous state and the crystalline state. A phase changeable material containing Te, In, Se, or the like as the main component can be used for forming the recording layers. Examples of the main component of the phase changeable material include Te—Sb—Ge, Te—Ge, Te—Ge—Sn, Te—Ge—Sn—Au, Sb—Se, Sb—Te, Sb—Se—Te, In—Te, In—Se, In—Se—Tl, In—Sb, In—Sb—Se, In—Se—Te or the like. In general, the first and second recording layers 4 and 11 are formed in the amorphous state, and absorb energy of a laser beam or the like for crystallization (initialization). The optical constants (refractive index n and extinction coefficient k) of the material forming the recording layers are changed in accordance with the phase change.

In order to form the recording layers with good repetition characteristics for recording and erasure, it is preferable to use a material containing the three elements Ge, Sb and Te as the main component. Further, it was confirmed by an experiment that particularly preferable materials for forming the recording layers are those represented by $Ge_xSb_yTe_z$, (x, y, and z denote an atomic ratio) that satisfy the range of $0.10 \leq x \leq 0.35$, $0.10 \leq y$, $0.45 \leq z \leq 0.65$, and $x+y+z=1$.

The optically separating layer 7 can be formed of a transparent material with respect to the wavelength of the laser beam radiated for recording/reproducing signals on/from the second information layer 22. The optically separating layer 7 has the function of optically separating the first information layer 21 and the second information layer 22. The optically separating layer can be formed of a material, for example, an ultraviolet curable resin, or a two-faced tape for attaching optical disks (for example, an adhesive sheet "DA-8320" manufactured by NITTO DENKO). The optically separating layer is formed by spin-coating, a 2P method, or the like. In the case where the optically separating layer is formed by the 2P method, there are two methods as follows. In a first method, the first information layer 21 is formed on the substrate 1, and then the optically separating layer whose surface is covered with spiral or concentric continuous grooves is formed by the 2P method. On top of that, the second information layer is formed. In this case, the protective substrate 15 is not always necessary. In a second method, the second information layer is formed on the protective substrate 15, and then the optically separating layer whose surface is covered with a spiral or concentric continuous groove is formed by the 2P method. On top of that, the first information layer is formed. In this case, the substrate 1 is formed by spin-coating or the like.

A semi-transmission layer 8 is formed of a material containing metal elements such as Au, Al, Si or the like as the main component. This layer preferably is provided to realize a light absorption correction structure of the second recording layer 11, but not necessarily formed. When two types of dielectric layers with different reflective index laminated with each other are used in place of the semi-transmission layer, optical characteristics similar to those of the semi-transmission layer can be obtained.

A reflective layer 14 preferably is formed of a metal element such as Au, Al, Ni, Fe, or Cr or an alloy thereof. Although the reflective layer 14 is not necessarily formed, it is preferable to form this layer to increase the efficiency of light absorptance of the second recording layer 11.

The protective layer 15 can be a resin layer formed by, for example, spin coating, or can be a resin sheet or a glass sheet similarly to the substrate 1. When the guide grooves for the second information layer 22 are formed on a surface of the optically separating layer 7 by the 2P method, the surface of the protective substrate 15 can remain smooth, and the protective substrate 15 can be attached to the second information layer 22 using, for example, an adhesive. Further, when the guide grooves for the second information layer 22 are not formed on a surface of the optically separating layer 7, spiral or concentric circular continuous grooves (guide grooves) preferably cover the surface of the protective substrate 15. In this case, the second information layer 22 is formed directly on the surface of the protective substrate 15. The second information layer 22 is attached to the first information layer 21 formed on the substrate 1 through the optically separating layer 7.

Two phase-change-type optical disks with the one-face-double layer structure may be attached with an adhesive or the like in such a manner that respective second information layers are opposed to each other to obtain an optical information recording medium with a four-layer structure in which recording and reproducing can be performed on both sides.

Figure 4:
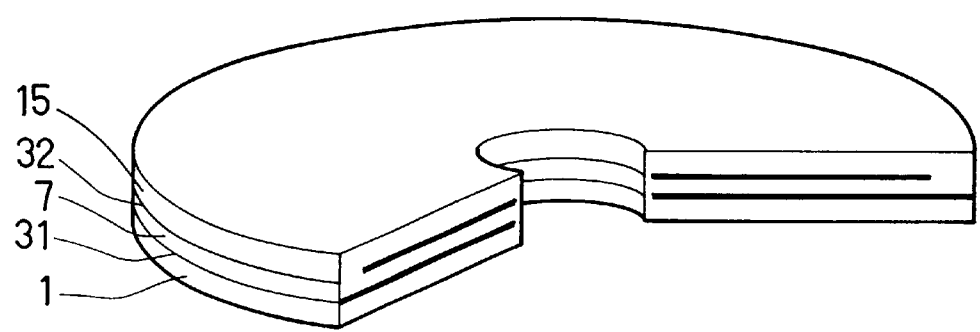
FIG. 4 is a partially cutaway perspective view showing another embodiment of an optical information recording medium of the present invention.
Figure 5:
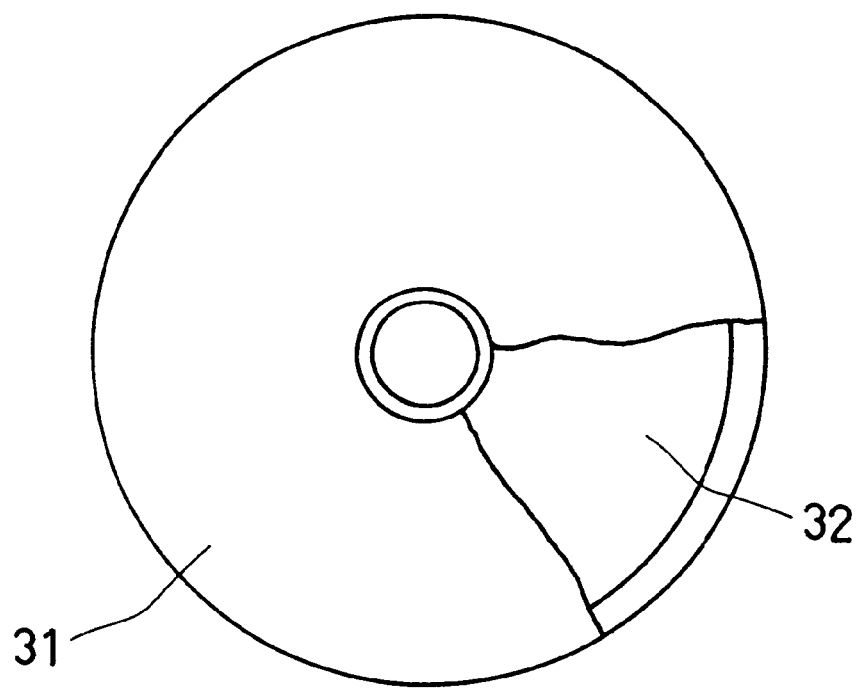
FIG. 5 is a partially cutaway plan view showing the embodiment shown in FIG. 4 of an optical information recording medium of the present invention.

As shown in FIGS. 1 and 2, the optical disk according to the present embodiment includes an area where the first information layer exists and the second information layer does not exist when viewed from the side to which a laser beam is incident (i.e., the side of the substrate 1). In the present embodiment, such an area is provided at the innermost circumference side of a ring shaped (toroidal) recording region. As shown in FIGS. 4 and 5, the above-mentioned area (the area where the first information layer 31 exists and the second information layer 32 does not exist) may be provided at the outermost circumference side of the recording region. As described, in the ring shaped recording region provided in the upper part of the disk-shaped substrate, the area where only the first information layer exists is preferably formed at the innermost circumference side and/or at the outermost circumference side of the recording region.

The area where only the first information layer exists can be formed, for example, by setting a diameter of a mask for forming an inner circumference of the first information layer smaller than that of a mask for forming an inner circumference of the second information layer, or by setting an inside diameter of a mask for forming an outer circumference of the first information layer larger than that of a mask for forming an outer circumference of the second information layer.

Also in the case of the initialization using a flash light, it is preferable to use an optical disk with the layer structure as shown in FIG. 3, similarly to the above. In this case, however, the area where only the first information layer exists as shown in FIGS. 1 and 2 is not always necessary.

The first recording layer 4, the second recording layer 11, the protective layers 2, 6, 9, and 13, the interface layers 3, 5, 10, and 12, the semi-transmission layer 8, and the reflective layer 14 can be formed by electron beam evaporation, sputtering, ion plating, a chemical vapor deposition method (CVD method), laser sputtering or the like.

Particularly important characteristics required in the first information layer are a high transmittance, a high sensitivity, capability to be overwritten at a high speed, and capability to obtain a certain extent of reflectance even in an unrecorded area. In order to increase a transmittance, the first information layer preferably includes no light absorbing layer (e.g., reflective layer) other than the first recording layer. In order to obtain the above-mentioned characteristics, the first information layer has a light absorption correction structure in which, with respect to a laser beam used for recording, the first information layer presents lower light absorptance when the first recording layer is amorphous than when it is crystalline.

Particularly important characteristics required in the second information layer are a high sensitivity, a high reflectance, and capability to be overwritten at a high speed. In order to obtain these characteristic, it is preferable that the first information layer is designed to have a H-L structure in which a reflectance is decreased by recording (formation of an amorphous mark) and a second information layer is designed to have a L-H structure in which a reflectance is increased by recording (formation of an amorphous mark). According to such structures, an optical information recording medium in which recording sensitivities of the first and second information layers and levels of the signals reproduced from these layers are uniform can be realized.

The structure for satisfying the above-mentioned characteristics will be exemplified in the following. In order to form the first information layer, Ge—Sb—Te with a thickness of 7 nm is formed as a first recording layer, and the first recording layer is sandwiched between two mixture layers $ZnS$—$SiO_2$ in such a manner that the one provided on the side of the substrate has a thickness of 100 nm and the other provided on the side opposite to the substrate has a thickness of 110 nm. On the other hand, as the second information layer, Au with a thickness of 10 nm, $ZnS$—$SiO_2$ with a thickness of 70 nm, Ge—Sb—Te with a thickness of 10 nm, $ZnS$—$SiO_2$ with a thickness of 80 nm, and Al—Cr with a thickness of 16 nm were formed on an optically separating layer in this order. In each information layer, a interface layer made of a nitride or the like may be formed between the recording layer and protective layers for the purpose of improving particularly the erasure characteristics. In any structures, the first information layer presents a lower reflectance when the first recording layer is amorphous than when it is crystalline while the second information layer presents a higher reflectance when the second recording layer is amorphous than when it is crystalline. The structures as described above are designed basically on the assumption that the laser beam having a wavelength in the vicinity of 660 nm is used for recording and reproducing.

The following is an explanation for a method for initializing the phase change type optical disk with the above-mentioned one-face-double layer structure using a laser beam. Initialization is a process for entirely crystallizing recording regions of the first and second recording layers, which are in the amorphous state when formed. In order to complete the initialization process in a short time, it is preferable to crystallize the respective recording layers using the laser beam at high power levels. From this viewpoint, a near infrared laser beam having a wavelength of around 800 nm is more preferable than the laser beam at a wavelength of 660 nm used for recording/reproducing, because light at high power levels can be obtained at a low cost by using the near infrared laser beam.

Figure 6:
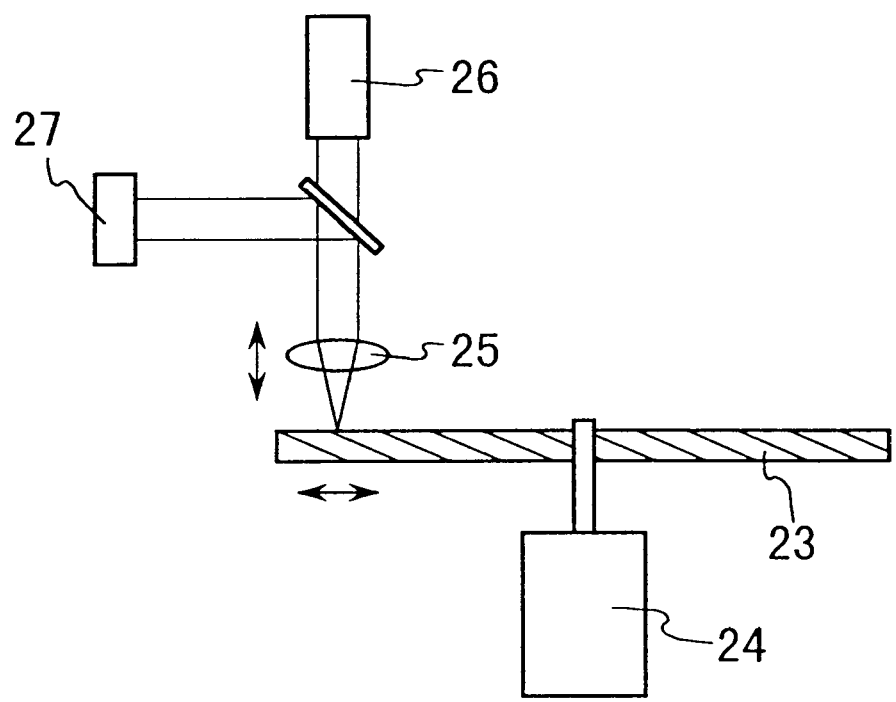
FIG. 6 shows a configuration of an apparatus for carrying out an initializing method according to the present invention and for recording/reproducing signals on/from an optical information recording medium of the present invention.

FIG. 6 schematically shows an embodiment of an apparatus for conducting initialization. In this example, a laser beam radiated from a laser beam source 26 via an objective lens 25 is focused onto the first or second information layer in an optical disk 23 being rotated by the spindle motor 24 by, for example, an astigmatism method. This focusing is preferably performed using focus error signals obtained from the respective information layers. It should be noted that a focusing control can be carried out by various methods including a knife-edge method. The apparatus shown in FIG. 6 also can be used for recording/reproducing signals on/from an optical disk. For reproducing signals, this apparatus is provided with a photodetector 27.

In the optical disk according to the present embodiment, with respect to the laser beam for recording/reproducing, the first information layer presents a lower reflectance when the first recording layer is amorphous than when it is crystalline while the second information layer presents a higher reflectance when the second recording layer is amorphous than when it is crystalline as described above. Such magnitude correlation applies to the reflectances with respect to a laser beam having a wavelength of 780 nm, 830 nm, etc., which can easily produce high power levels.

In addition, in the first information layer, a transmittance, a recording sensitivity, a signal modulation factor need to be increased at the same time. Accordingly, the first information layer generally presents a very low reflectance in the range of a few percent when the first recording layer is amorphous. In contrast, in the second information layer, since signals are reproduced by the laser beam transmitted through the first information layer, a reflectance higher than that of the first information layer has to be selected for the second information layer whether the second recording layer is amorphous or crystalline. This means, when the recording layer of the first information layer is crystalline, the focus error signals obtained from the first information layer are always smaller than those obtained from the second information layer with respect to any of the laser beam having a wavelength of 660 nm, 780 nm, or 830 nm, which is commonly used as a laser beam for performing initialization in the art, whereby the focus error signals cannot be obtained easily from the first information layer.

However, in the area where the second information layer is not formed on the first information layer, it is easy to obtain the focus error signals from the first information layer. That is, the focus error signals easily can be obtained from the first information layer by, for example, increasing a gain of a detector in the initialization apparatus. On the other hand, in the area where the second information layer is formed on the first information layer, even if the gain of the detector in the apparatus is increased, a ratio of the focus error signals obtained from the respective information layers remains the same. Accordingly, focusing on the first information layer still remains difficult.

Once focusing is performed on the first information layer to start initialization, a crystallized area is generated in the area irradiated with the laser beam for initialization to increase a reflectance of the first information layer. The quantity of light reaching the detector in the initialization apparatus thus increases. Therefore, even in the area where the second information layer exists, it becomes relatively easy to continue the initialization process of the first information layer (even when the area irradiated with the laser beam is scanned to continued the initialization process).

The above-described embodiment of the initialization method according to the present invention in which initialization of the first information layer is started from the area where only the first information layer is formed is particularly suitable for the case where, with respect to the laser beam having a wavelength of $\lambda_1$ for initializing the first information layer, 1) the quantity of light reflected from the first information layer before its initialization is smaller than that of light reflected from the first information layer after its initialization; and 2) the quantity of light reflected from the first information layer before its initialization is larger than that of light reflected from the second information layer. The reason for this is that, in the above-mentioned case, focus error signals obtained from the first information layer are enhanced by the initialization, and hence, as a result of the initialization, an intensity of the focus error signals obtained from the first information layer approaches that of the focus error signals obtained from the second information layer.

Comparison between the intensities of the respective focus error signals obtained from the first and second information layers can be achieved by comparing the reflectance of the first information layer with the value obtained by multiplying the reflectance of the second information layer by the square of the transmittance of the first information layer. This is because the intensity of the signals obtained from the second information layer is the value obtained after the light beam has passed the first information layer twice.

Next, the order of conducting the initialization of the first and second information layers will be explained.

With respect to a laser beam having a wavelength of $\lambda_2$ for initializing the second information layer, when a transmittance of the first information layer before its initialization is higher than that of a transmittance of the first information layer after its initialization, it is preferable to initialize the second information layer before initializing the first information layer. If the first information layer is initialized first, the transmittance of the first information layer decreases when the initialization of the second information layer is conducted and hence, relatively high laser power is required for initializing the second information layer.

As described above, the embodiment of the initialization method according to the present invention in which the first information layer is initialized after the second information layer is initialized preferably is applied to the case where 1) with respect to a laser beam having a wavelength of $\lambda_1$ for initializing the first information layer, the quantity of light reflected from the first information layer before its initialization is smaller than that of light reflected from the second information layer before its initialization; 2) with respect to the laser beam having a wavelength of $\lambda_1$, the quantity of light reflected from the second information layer before its initialization is larger than that of light reflected from the second information layer after its initialization; and 3) with respect to the laser beam having a wavelength of $\lambda_2$ for initializing the second information layer, the quantity of light reflected from the first information layer before its initialization is smaller than that of light reflected from the second information before its initialization. The reason for this is that, by conducting initialization in this order, the imbalance in the intensities of the focus error signals obtained from the first information layer and from the second information layer is corrected (i.e., the ratio of these intensities approaches one).

The initialization method obtained by combining the above-mentioned two embodiments corresponds to the most preferable embodiment of the present invention. In this embodiment, a starting point of the initialization of the first information layer is in the area where the second information layer is not formed on the first information layer, and the first information layer is initialized after the second information layer is initialized in the area where both the first and second information layers are formed.

Next, the cases where this embodiment particularly effectively exhibits its functions will be explained. First, the functions are particularly effectively exhibited in the case where 1) with respect to a laser beam having a wavelength of $\lambda_1$ for initializing the first information layer, the quantity of light reflected from the first information layer before its initialization is smaller than that of light reflected from the first information layer after its initialization; and 2) with respect to the laser beam having a wavelength of $\lambda_1$, the quantity of light reflected from the first information layer before its initialization is smaller than that of light reflected from the second information layer either before or after its initialization; and 3) with respect to the laser beam having a wavelength of $\lambda_2$ for initializing the second information layer, a transmittance of the first information layer before its initialization is higher than that of the first information layer after its initialization.

Second, the functions are exhibited particularly effectively in the case where 1) with respect to a laser beam having a wavelength of $\lambda_1$ for initializing the first information layer, the quantity of light reflected from the first information layer before its initialization is smaller than that of light reflected from the first information layer after its initialization; and 2) with respect to the laser beam having a wavelength of $\lambda_1$, the quantity of light reflected from the first information layer before its initialization is smaller than that of light reflected from the second information layer either before or after its initialization; 3) with respect to the laser beam having a wavelength of $\lambda_1$, a reflectance of the second information layer after its initialization is lower than that of the second information layer before its initialization; 4) with respect to the laser beam having a wavelength of $\lambda_2$ for initializing the second information layer, the quantity of light reflected from the first information layer before its initialization is smaller than that of light reflected from the second information layer before its initialization.

In each embodiment for conducting initialization, both the first and second information layers may be initialized using the laser beam having the same wavelength. Further, even in the case where the second information layer is initialized first, it is not always necessary to start the initialization of the first information layer after the initialization of the second information layer is completed. By using an initialization apparatus with different light souses provided for the respective information layers, while continuing the initialization of the second information layer, the first information layer may be initialized in the area where the initialization of the second information layer is completed. Further, even when the apparatus is provided with only one laser beam source, a laser beam may be divided into two or more by a beam splitter. The laser beams thus obtained irradiate the information layers, respectively, and initialize them while shifting the positions to irradiate. In this case, the laser beams should be arranged in such a manner that the initialization of the first information layer is performed in the area where the initialization of the second information layer is completed.

The following is an explanation for the method for initializing the phase change type optical disk with a one-face-double layer structure using a flash light.

Figure 8:
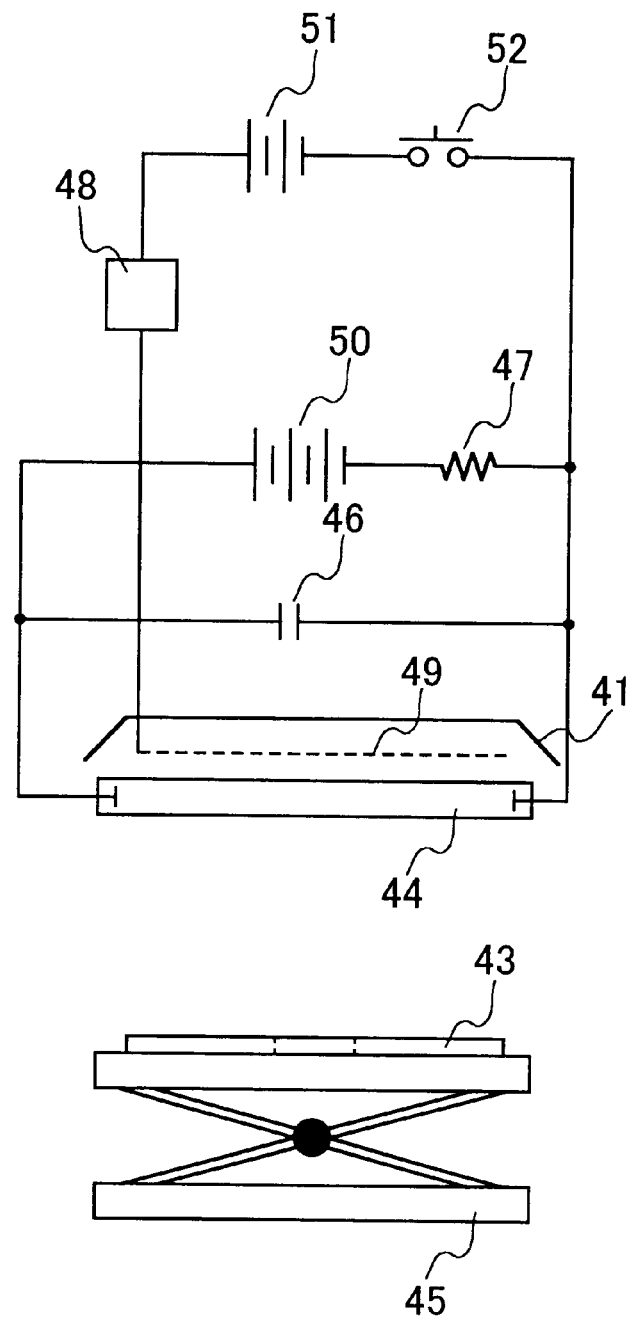
FIG. 8 shows a configuration of an embodiment of an apparatus for conducting an initialization according to the present invention using a flash light source.
Figure 9:
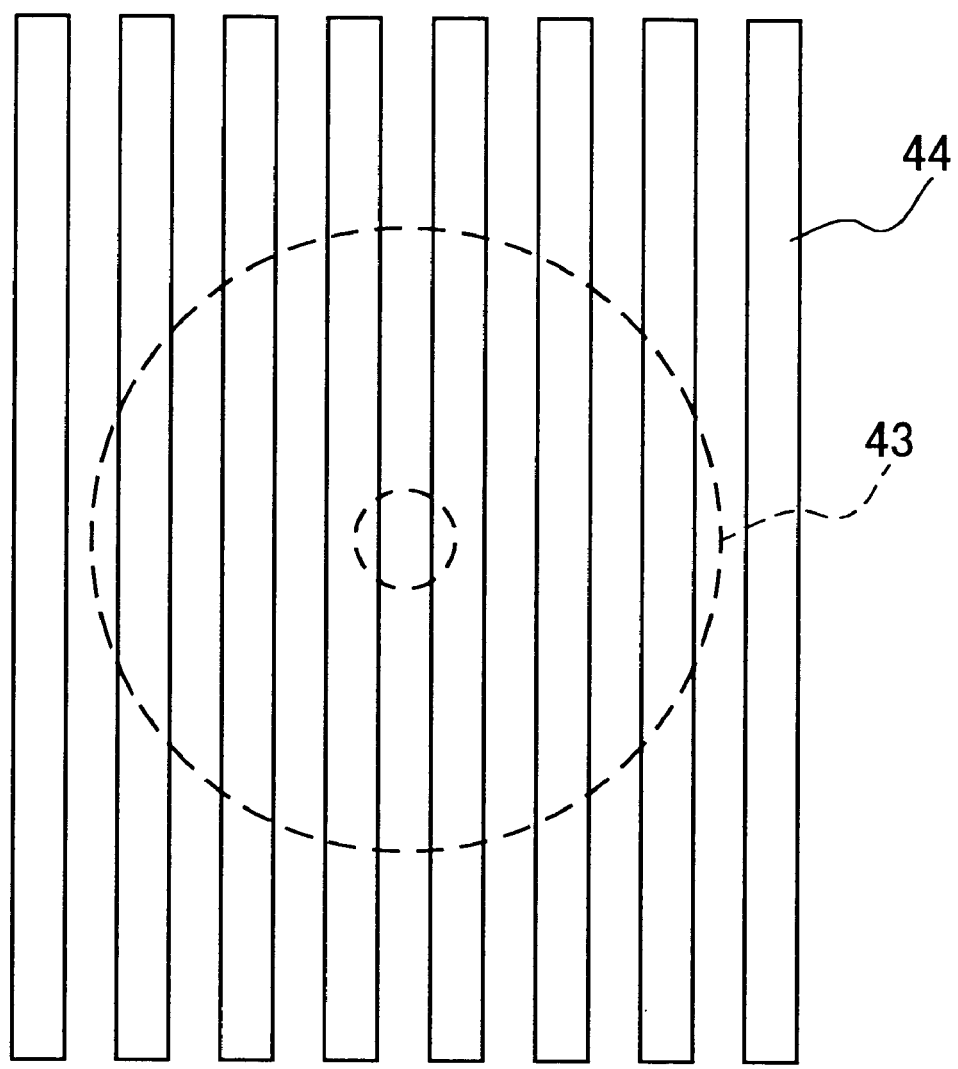
FIG. 9 is a plan view showing how the optical information recording medium in the apparatus shown in FIG. 8 and xenon lamps are arranged.

FIGS. 8 and 9 schematically show an embodiment of an initialization apparatus. A reflecting plate 41 is arranged so as to cover xenon lamps 44 as a light source. The light emitted from the xenon lamps 44, along with the light reflected from the reflecting plate 41, irradiates an optical disk 43, which is disposed on a stand 45 having a height control mechanism.

When a switch 52 is turned on in a state where a main capacitor 46 connected to a power supply 50 and a charging resistance 47 is charged, energy having a high frequency and a high voltage is applied to a trigger electrode 49 of the xenon lamps 44 from the trigger power supply 51 by the action of a trigger coil 48. Such application of the energy results in dielectric breakdown of xenon gas in the lamp 4. At the same time, by the voltage of the power supply 50 and the electric energy accumulated in the main capacitor, a discharge suddenly occurs in the xenon lamp 44. The flash light thus is emitted.

Figure 10:
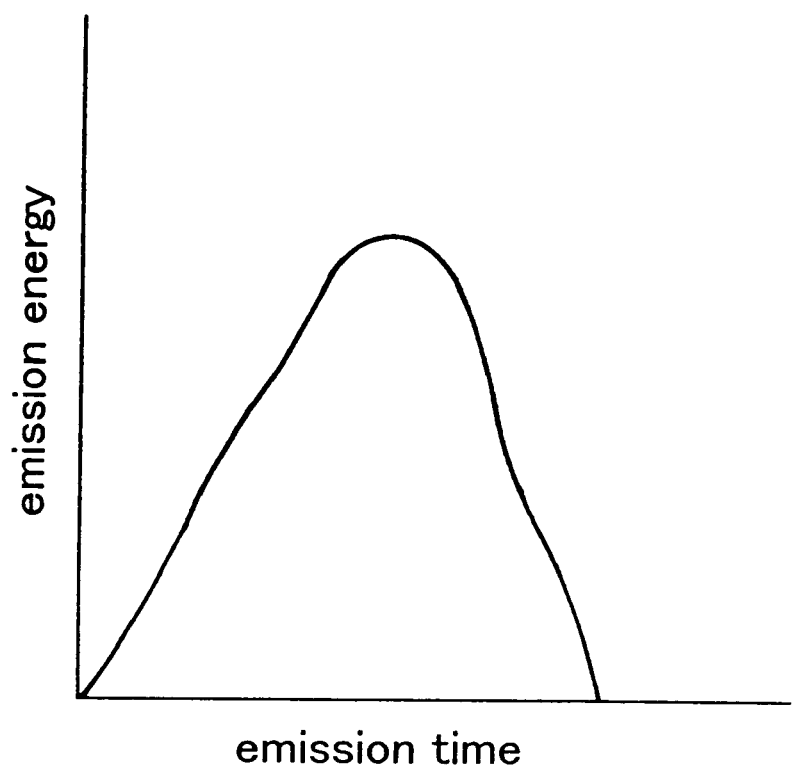
FIG. 10 shows an example of a waveform of a flash light.

FIG. 10 shows a result obtained when a waveform of the flash light emitted from the above-mentioned apparatus was measured using an oscilloscope. The emission time shown in the horizontal axis can be adjusted by changing a capacity of the main capacitor. In the vertical axis, the quantity of the flash light, which corresponds to the flash light intensity, is shown. The intensity can be converted into emission energy. The emission energy is given by E/S (J/cm$^2$) where E (J) denotes input energy to the lamps, which is given by 1/2 CV$_2$ where C denotes a capacity of the main capacitor and V denotes a voltage (during charging) at both ends thereof, and S (cm$^2$) denotes an opening space (cm$^2$) of the reflecting plate.

Further, as shown in FIG. 9, in the above-mentioned apparatus, the xenon lamps are arranged so as to cover the entire optical disk as viewed along the direction in which a laser beam is radiated.

EXAMPLES

Hereinafter, the present invention will be described more specifically by way of example, but is not limited thereto.

Example 1

Disk-shaped polycarbonate having a radius of 60 mm and a thickness of 0.58 mm was used as a first substrate. The substrate was covered with guide grooves of concavities and convexities having a pitch of 0.60 µm and a groove depth of 70 nm. ZnS-20 mol % SiO$_2$, Ge$_{29}$Sb$_{21}$Te$_{50}$, and ZnS-20 mol % SiO$_2$ were formed thereon in this order by magnetron sputtering so that the thicknesses thereof became 100 nm, 7 nm, and 110 nm, respectively. Thus, the first information layer was formed on the first substrate. On the other hand, disk-shaped polycarbonate having a radius of 60 mm and a thickness of 0.6 mm was used as a second substrate. Similarly, the substrate was covered with guide grooves of concavities and convexities having a pitch of 0.60 µm and a groove depth of 70 nm. Al-2at % Cr, ZnS-20 mol % SiO$_2$, Ge$_{29}$Sb$_{21}$Te$_{50}$, ZnS-20 mol % SiO$_2$, and Au were formed thereon in this order by magnetron sputtering so that the thicknesses thereof became 16 nm, 80 nm, 10 nm, 70 nm, and 10 nm, respectively. Thus, the second information layer was formed on the second substrate. The first information layer was formed in the area between radii of 20 mm and 59 mm, and the second information layer was formed in the area between radii of 23 mm and 59 mm of the disk.

Then, an epoxy based ultraviolet curable resin was applied onto the second information layer thus formed, and the first substrate and the second substrate were attached each other so that the first information layer and the second information layer were opposed. Then, irradiation of ultraviolet rays was performed. Thus, an optical disk was obtained where the first substrate (substrate), the first information layer, an intermediate resin layer (optically separating layer), the second information layer, and the second substrate (protective substrate) were laminated in this order. Preferable results were obtained when the thickness of the intermediate resin layer is not less than 30 µm and not more than 60 µm. In this example, experimental results obtained when the thickness was 40 µm are shown.

In this optical disk, the crystalline state of the recording layer is used as a non-recorded state, and the amorphous state of the recording layer is used as a recording mark. Table 1 shows the designed values of the optical characteristics of the optical disk with respect to a laser beam having a wavelength of 660 nm and 830 nm, and Table 2 shows the values obtained by actual measurement (the optical characteristics were measured using a mirror finished substrate without guide grooves in order to eliminate the influence of diffraction at the grooves).

TABLE 1

| | Wavelength: 660 nm | | Wavelength: 830 nm | |
| --- | --- | --- | --- | --- |
| | 1st info layer | 2nd info layer | 1st info layer | 2nd info layer |
| Reflectance (amorphous) | 2% | 37% | 2% | 51% |
| Reflectance (crystalline) | 11% | 13% | 9% | 35% |
| Transmittance (amorphous) | 70% | | 72% | |
| Transmittance (crystalline) | 45% | | 45% | |

TABLE 2

| | Wavelength: 660 nm | | Wavelength: 830 nm | |
| --- | --- | --- | --- | --- |
| | 1st info layer | 2nd info layer | 1st info layer | 2nd info layer |
| Reflectance (before initialization) | 3% | 38% | 2% | 53% |
| Reflectance (after initialization) | 10% | 15% | 8% | 33% |

TABLE 2-continued

|  | Wavelength: 660 nm | | Wavelength: 830 nm | |
| --- | --- | --- | --- | --- |
|  | 1st info layer | 2nd info layer | 1st info layer | 2nd info layer |
| Transmittance (before initialization) | 70% | | 70% | |
| Transmittance (after initialization) | 45% | | 40% | |

Tables 1 and 2 show that the optical characteristics of the produced optical disk are substantially as designed. It should be noted that when signals in the second information layer are reproduced, the value obtained by multiplying the reflectance of the second information layer by the square of the transmittance of the first information layer is the effective reflectance of the second information layer due to the presence of the first information layer, which is provided nearer the light source. For example, when signals are not recorded on the first information layer, the reflectance of the second information layer before its initialization is 38% ×45% ×45% =8%.

Recording layers in each of the information layers in this optical disk were initialized using an initialization apparatus as shown in FIG. 6. The laser beam used for initialization was a laser beam with a wavelength of 830 nm. The laser beam for initialization was shaped so as to be 100 μm in the radial direction and 20 μm in the circumferential direction of the disk when focused on the respective information layers.

In the area where the second information layer is formed on the first information layer and the area where the second information layer is not formed on the first information layer, the laser beam was radiated before conducting initialization and error signals for focusing were observed with an oscilloscope. The sensitivity of the detector was adjusted with an automatic gain controller. The amplitude ratio of the focus error signals obtained from the respective layers are shown in Table 3 below.

TABLE 3 the ratio of amplitudes of the focus error signals obtained from the first information layer to those of the focus error signals obtained from the second information layer

|  | Before the second information layer is initialized | After the second information layer is initialized |
| --- | --- | --- |
| Before the first information layer is initialized | <0.1 | 0.13 |
| After the first information layer is initialized | 1.2 | 1.5 |

As seen from Table 3, when the second information layer is formed on the first information layer, it was extremely difficulty to release the focus error signals from the first information layer. Actually, the focusing on the first information layer could not be performed in the area where the second information layer is provided. However, in the area without the second information layer, focussing on the first information layer was performed easily. The first information layer was initialized at a linear velocity of 6 m/s and a laser current of 1000 mA.

Example 2

In the optical disk produced in the above-mentioned example 1, examination was made as to which of the first and second information layers should be initialized first using an initialization apparatus as shown in FIG. 6. In this example, the laser beam used for initializing the respective information layers was also a laser beam having a wavelength of 830 nm. The laser beam for initialization was shaped so as to be 100 μm in the radial direction and 20 μm in the circumferential direction of the disk when focused on the respective information layers.

In the area where both the first and second information layer exists, the ratio of the focus error signals obtained from the respective layers before they are initialized is as shown in Table 3. In the area where two information layers exist, the focusing on the first information layer could not be performed first. However, when the second information layer was initialized first, it became possible to perform the focussing on the first information layer as well as to initialize the first information layer. In this case, the second information layer could be initialized at a linear velocity of 8 m/s and a laser current of 1000 mA.

An attempt was made to initialize the second information layer after the first information layer was initialized in the same manner as that in the above-mentioned example 1. In this case, the second information layer could not be initialized at 1000 mA until the linear velocity was decelerated to 5 m/s. In addition, if the initialization of the first information layer was conducted before the second information layer was initialized, such an initialization process was more susceptible to disturbance as compared with the case of vice versa, and the focusing operation during the initialization of the first information layer could be interrupted by minor vibration. In contrast, when the second information layer was initialized before the first information was initialized, the focusing operation was never interrupted by disturbance.

The above-mentioned results show that stable initialization can be realized by initializing the second information layer first, and then initializing the first information layer. Further, in the first information layer, the place where the focussing for conducting initialization is started is preferably in the area where only the first information layer exists while the second information layer does not exist as described above.

Example 3

Figure 7:
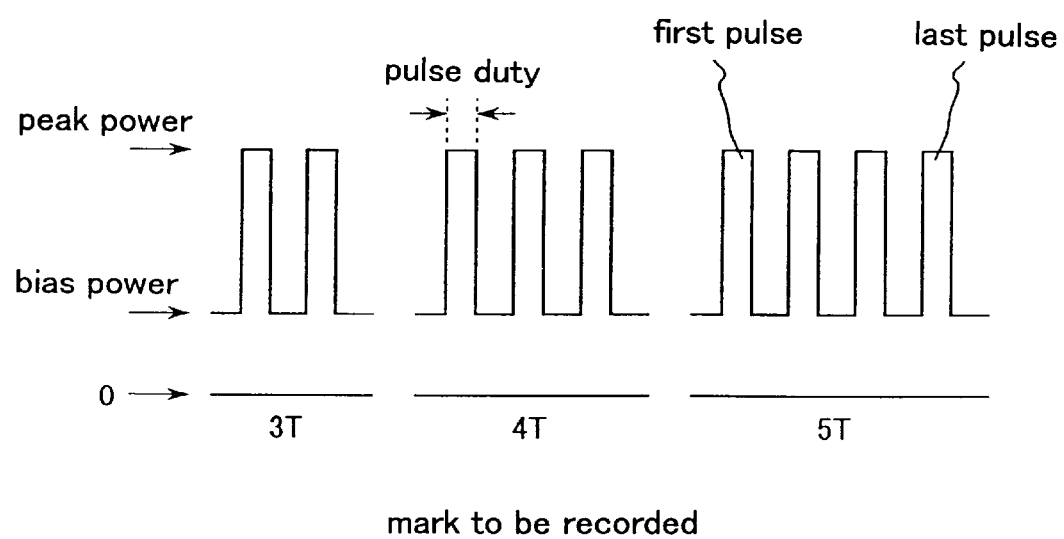
FIG. 7 shows an example of a modulated waveform of recording pulses when signals are recorded on an optical information recording medium.

An experiment with regard to signal recording/reproducing was conducted for the optical disk with a one-face-double layer structure whose first and second information layers were initialized in the manner described in the examples 1 and 2. Signals were recorded/reproduced on/from both the guide grooves (grooves) and portions between the guide grooves (lands) with a recording/reproducing apparatus with a configuration as shown in FIG. 6. The laser beam source used for recording and reproduction was a semiconductor laser with a wavelength of 660 nm, and the NA of the objective lens was 0.6. Recording information was recorded in a modulation system of 8/16, RLL (2,10) with a recording pulse strategy shown in FIG. 7 while rotating the disk at a linear velocity of 9 m/s. A peak power and a bias power were selected such that the reproduction jitter of random signals obtained after repeating overwriting was minimized.

As a result, in the initialized first information layer, the worst jitter value of the reproduced signals when random signals were repeatedly overwritten 1 to 100 times was 10%, which was satisfactory. In this connection, regarding the first information layer before its initialization, signals could not be recorded because the focusing on layer could not be performed.

Further, in the case where the second information layer was initialized first and then the first information layer was initialized, the worst jitter value of the reproduced signals in the second information layer when random signals were repeatedly overwritten 1 to 100 times was 10%, which was satisfactory.

Still further, in the case where the fist information layer was initialized first and then the second information layer was initialized, the worst jitter value of the reproduced signals in the second information layer when random signals were repeatedly overwritten 1 to 100 times was 14%, which was not satisfactory. It is considered that this is caused by the fact that the linear velocity had to be decreased to 5 m/s to initialize the second information layer because the first information layer was initialized first. If the second information layer is initialized at a slow linear velocity, heat dissipation load to the second information layer increases, and disk-noise is liable to increase.

Furthermore, in the second information layer before its initialization, the jitter value of the reproduced signals when random signals were repeatedly overwritten 1 to 10 times was 20% or more, which was considerably unfavorable, and recorded information could not be accurately reproduced.

Example 4

An optical disk was initialized using an apparatus as shown in FIGS. 8 and 9. As a flash light source, eight straight-tube-shaped xenon lamps having a diameter of 15 mm were provided. These xenon lamps were arranged in parallel with each other at equal intervals at a distant of 10 mm from the optical disk. The opening space of the xenon lamp was 300cm$^2$.

Initial crystallization of the first and second recording layers of the optical disk was conducted while changing the emission time of the flash light source to 20 $\mu$s, 75 $\mu$s, 200 $\mu$s, and 400 $\mu$s.

The configuration of the optical disk used in this example was as follows.

Polycarbonate having a radius of 40 mm and a thickness of 0.58 mm was used as a substrate (first substrate). The substrate was covered with guide grooves of concavities and convexities having a pitch of 0.60 $\mu$m and a groove depth of 70 nm. ZnS-20 mol % SiO$_2$, GeN, Ge$_{43}$Sb$_{25}$Te$_{32}$, GeN, and ZnS-20 mol % SiO$_2$ were formed thereon in this order by magnetron sputtering so that the thicknesses thereof became 100 nm, 5 nm, 7 nm, 5 nm, and 110 nm, respectively. Thus, the first information layer was formed on the first substrate. Each above-mentioned thickness was designed based on the calculations considering the optical characteristics with respect to the laser beam having a wavelength of 650 nm used for recording and reproducing.

Important characteristics in the first information layer are a high transmittance, a high sensitivity, and a light absorption correction structure, which enables the overwriting at a high speed. Particularly, the transmittance was designed to be 60%.

On the other hand, polycarbonate having a radius of 40 mm and a thickness of 0.6 mm was used as a second substrate. Similarly, the substrate was covered with guide grooves of concavities and convexities having a pitch of 0.60 $\mu$m and a groove depth of 70 nm. Al-2at % Cr, ZnS-20 mol % SiO$_2$, GeN, Ge$_{43}$Sb$_{25}$Te$_{32}$, GeN, ZnS-20 mol % SiO$_2$, and Au were formed thereon in this order by magnetron sputtering so that the thicknesses thereof became 16 nm, 5 nm, 80 nm, 5 nm, 10 nm, 70 nm, and 10 nm, respectively. Thus, the second information layer was formed on the second substrate.

Also in the second information layer, each above-mentioned thickness was designed based on the calculations considering the optical characteristics with respect to the laser beam having a wavelength of 650 nm used for recording and reproducing, as in the first information layer.

The second information layer has a high sensitivity, high reflectance, and a light absorption correction structure, which enables the overwriting at a high speed. Particularly, the reflectance was designed to be 30%.

After the first and second information layers were formed, an acrylic ultraviolet curable resin was applied onto the second information layer by spin-coating so that the thickness thereof became 30 $\mu$m, and the first information layer was laminated on the second information layer so that the film surface of the first information layer and that of the second information layer were opposed. Then, irradiation of ultraviolet rays was performed. Thus, an optical disk was fabricated where the first substrate, the first information layer, the optically separating layer, the second information layer, and the second substrate (protective substrate) were laminated in this order.

With respect to this optical disk, initialization of the information layers was conducted while changing the conditions of the emission energy and emission time. The results are shown in FIGS. 11 and 12.

Figure 11:
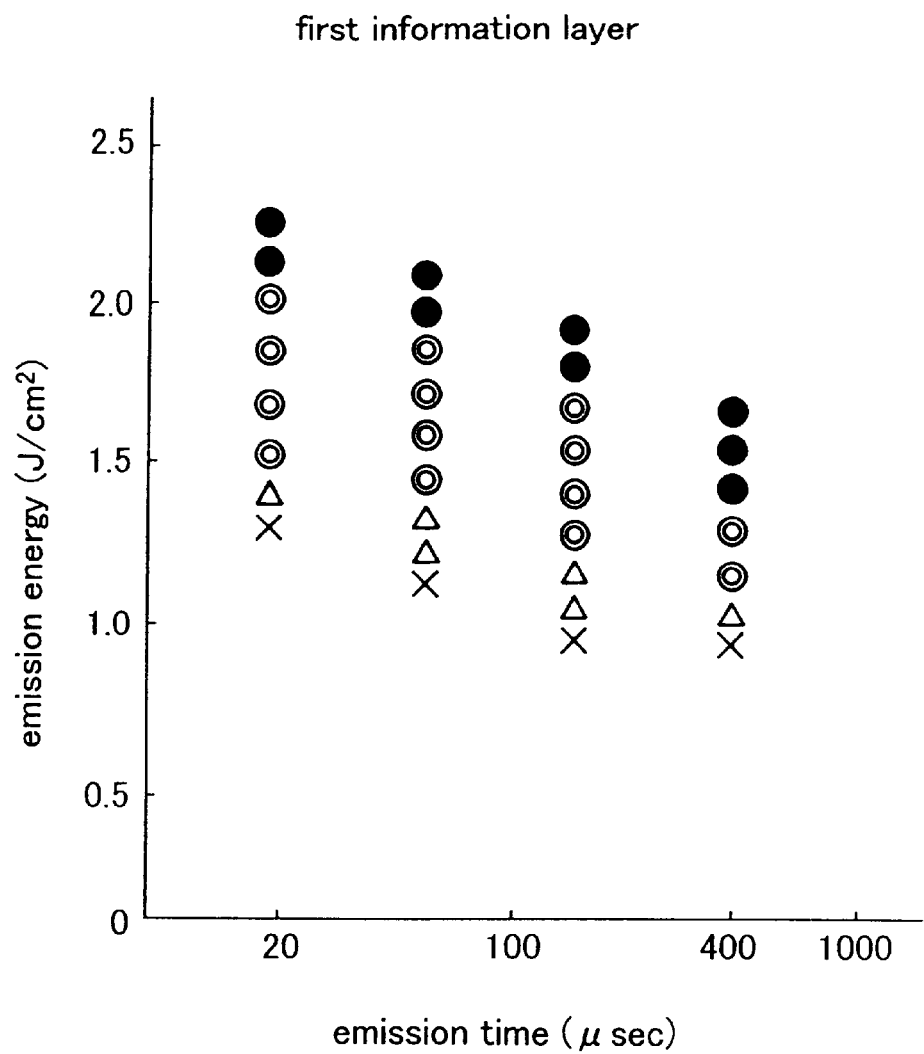
FIG. 11 shows an example of a result when a first information layer is initialized using a flash light.
Figure 12:
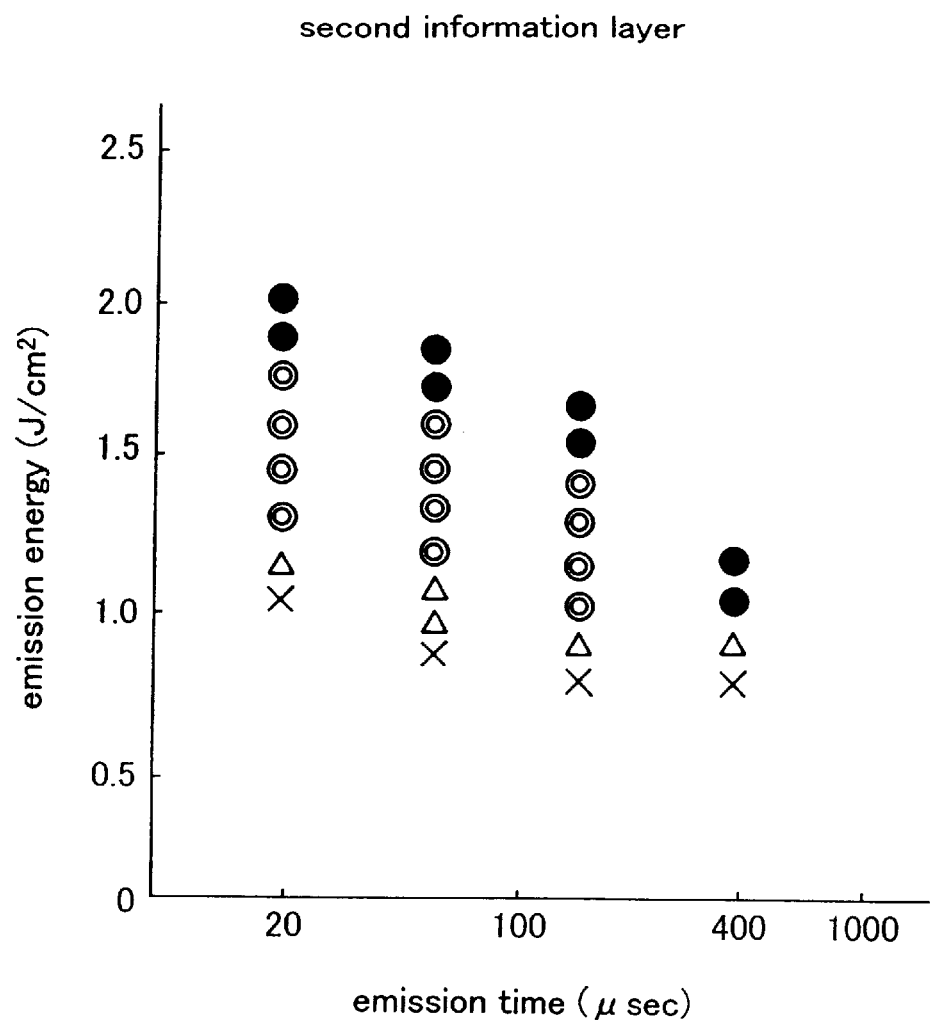
FIG. 12 shows an example of a result when a second information layer is initialized using a flash light.

FIG. 11 shows the results obtained when the first information layer was initialized. Specifically, the optical disk was deposited on the stand so that the first information layer was on the side of the lamp, and the emission energy was changed within the range of 1.0 to 2.3 J/cm$^2$ and the emission time was changed to 20 $\mu$s, 75 $\mu$s, 200 $\mu$s, and 400 $\mu$s.

In FIG. 11, the mark ◎ represents the case where no crack was observed even when the first information layer was crystallized and the satisfactory jitter was obtained. The evaluation of the jitter is as follows. In the case where the first information layer was overwritten using a semiconductor laser with a wavelength of 650 nm and the objective lens with the NA of 0.6 at the linear velocity of 8 m/s, when variation of the jitter is not more than 2% and the initial value is not more than 9.0% during 1 to 10 cycles of overwriting, the jitter value was judged satisfactory. The presence or absence of the cracks was confirmed by observing the recording layer with a microscope.

The mark Δ represents s the case where no crack was observed but the variation of the jitter is not less than 2%.

The mark ● represents the case where the satisfactory jitter was obtained but cracks occurred. The cracks degrade the repetition characteristics for recording and erasure. That is, in accordance with the repetition of recording and erasure, defective portions in the information reproducing regions are enlarged from each crack serving as a starting point.

The mark × represents the case where the initialization was insufficiently performed and some portions were not crystallized.

As can be seen from FIG. 11, substantially favorable results were obtained when the first information layer was initialized using the flash light with the luminescent energy of 1.5 to 2.0 J/cm$^2$ and the emission time of 20 to 400 $\mu$s.

FIG. 12 shows the results obtained when the second information layer was initialized.

In this case, also, the optical disk was deposited on the stand so that the first information layer was on the side of the lamp, and the emission energy was changed within the range of 1.0 to 2.3 J/cm² and the emission time was changed to 20 µs, 75 µs, 200 µs, and 400 µs.

The above-mentioned explanations also apply to the marks ◎, Δ, ●, and × shown in FIG. 12.

As can be seen from FIG. 12, when the second information layer was initialized using the flash light with the luminescent energy of 1.2 to 1.8 J/cm² and the emission time of 20 to 200 µs.

Figure 13:
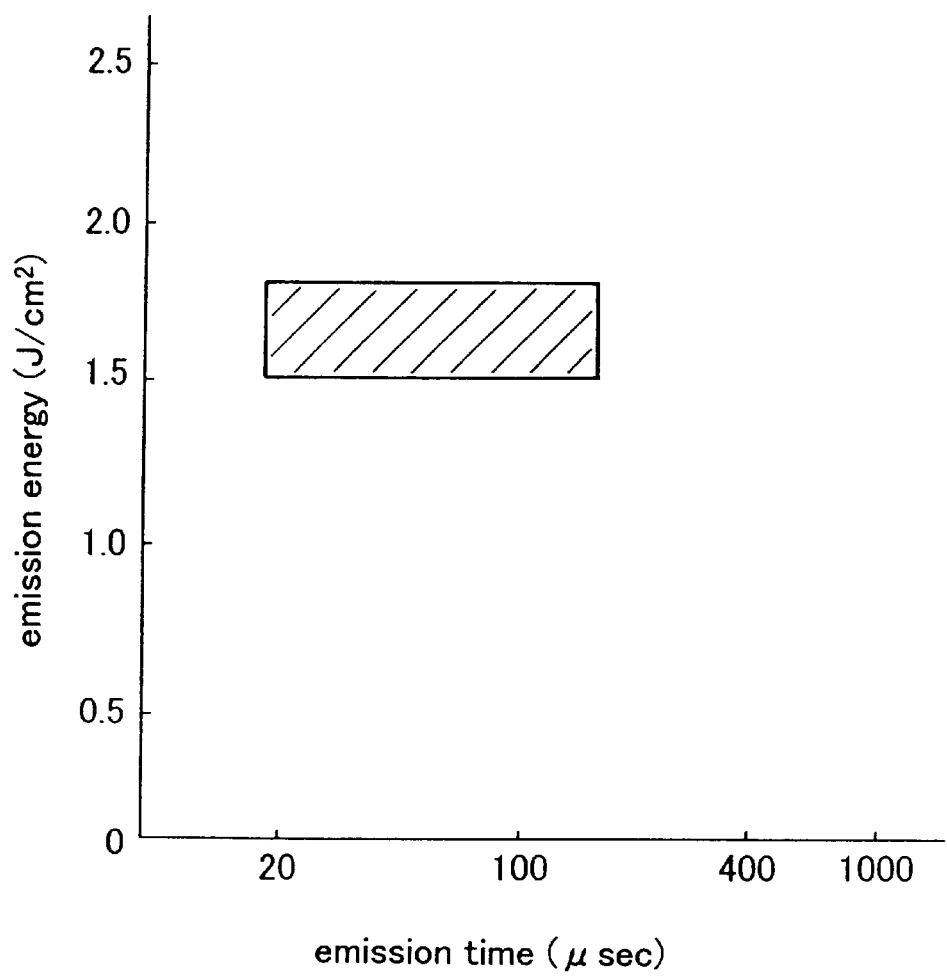
FIG. 13 shows a range in which the first and second information layer are initialized favorably at the same time using a flash light in the example of the present invention.

Further, in order to initialize the first and second information layer at the same time, the preferable range was as shown in FIG. 13 (the emission energy: 1.5 to 1.8 J/cm², the emission time: 20 to 200 µs).

Further, as the emission time becomes shorter, thermal damages decrease. In this regard, the emission time may be less than 20 µs. However, if the emission time is too short, the emission energy may not be increased sufficiently. The emission time around 20 to 200 µs is thus preferable.

The first and second information layers were initialized in the above-mentioned manner while changing the thickness of the first recording layer. As a result, it was found that, when the thickness of the first recording layer is over 10 nm (when the flash light passes through the first information layer at a transmittance of over 70%), the first information layer could be initialized even if the emission energy of the flash light increased while the second information layer was not sufficiently crystallized. Furthermore, when the thickness of the first recording layer is less than 5 nm (when the flash light passes through the first information layer at a transmittance of less than 40%), cracks occurred in the first recording layer even when the emission energy of the flash light is reduced.

Further, while changing the distance between the lamps and the optical disk, the first and second information layers were initialized in the above-mentioned manner. As a result, when the distance was less than 5 mm, a warp of the optical disk increased. On the other hand, when the distance was 15 mm, the emission energy of the flash light was not enough for performing sufficient initialization. The distance in the range of 5 to 10 mm was thus preferable.

Example 5

In the example 4, initialization was conducted for an optical disk having a radius of approximately 40 mm (40 mm±10 mm). However, when an optical disk having a radius of 60 mm was used, some areas therein were not favorably initialized. Specifically, in the area between a radius of 56 mm and the outer circumference of the disk, cracks were likely to occur in the second recording layer, and it became difficult to avoid the occurrence of these cracks.

Therefore, the initialization was conducted in the following manner. First, the second information layer was initialized using a flash light with the reduced emission energy of 1.2 J/cm². Second, the first information layer was initialized with a flash light with emission energy of 1.4 J/cm² (which is less than 1.5 J/cm²). When the flash light was radiated twice in the above-mentioned manner, the occurrence of cracks was not observed. Further, an evaluation of jitters was made by performing overwriting. As a result, jitter values of 8.5 to 9.0% were obtained after the first overwriting, and a C/N ratio of not less than 55 dB and an erasure ratio of not less than 30 dB were obtained.

The second information layer has a relatively high sensitivity and thus easily is initialized. Accordingly, if the second information layer is initialized along with the first information layer by the one-time irradiation of a flash light, the power of the flash light is liable to be too high for the second information layer. Particularly, in the optical disk with a larger radius thus having a larger area to be initialized, subjecting an area to the flash light with excessive power easily occurs. However, as mentioned above, if the second information layer was initialized first under the conditions suitable for initializing the second information layer, and then the first information layer was initialized, the range of the conditions for performing a favorable initialization can be increased. Particularly, it is considered that, by the flash light radiated for initializing the second information layer, a "seed" for initialization (crystallization) is generated in the first recording layer. Thus, the first information layer can be initialized by utilizing this "seed". Therefore, according to the method in which a plurality of flash lights are radiated, the first information layer can be initialized by a laser beam with low energy. Radiating a plurality of flash lights is particularly effective for an optical disk having a radius of not less than 50 mm.

Further, the number of times of a flash light irradiation is not limited to twice. Not less than three times of irradiation may be performed. By increasing the frequency of irradiation, the energy of the flash light per each irradiation can be made smaller.

INDUSTRIAL APPLICABILITY

As described above, according to the present invention, an optical information recording medium with a large capacity capable of recording signals in a plurality of information layers from one side can be initialized stably using a laser beam. The present invention also provides a method for initializing the above-mentioned optical information recording medium using a flash light. As described above, the present invention has a great utility value in the field of an optical information recording medium with a plurality of information layers.

What is claimed is:

1. An optical information recording medium comprising
a substrate and at least a first information layer and a second information layer,
the first information layer and second information layer, on/from which signals can be recorded/reproduced, being formed on the substrate in this order,
wherein an area where the first information layer exists and the second information layer does not exist is provided on the substrate,
the first information layer includes a first recording layer and the second information layer includes a second recording layer, and the first and second recording layers are formed of a material that changes reversibly between an amorphous state and a crystalline state by irradiation of a laser beam from a side of the substrate, and
with respect to a laser beam having a wavelength of $\lambda_0$ radiated from the side of the substrate for reproducing signals recorded on the first and second recording layers, a reflectance $R_0(1amo)$ of the first information layer when the first recording layer is in an amorphous state, a reflectance $R_0(1cry)$ of the first information layer when the first recording layer is in a crystalline state, a reflectance $R_0(2amo)$ of the second information layer when the second recording layer is in an amorphous state, and a reflectance $R_0(2cry)$ of the second information layer when the second recording layer is in a crystalline state satisfy the relationships:

$$R_0(1amo) < R_0(1cry), \text{ and } R_0(2amo) > R_0(2cry).$$

2. The optical information recording medium according to claim 1,
wherein the substrate has a disk shape, and
the area where the first information layer exists and the second information layer does not exist is provided at least at one portion selected from an outermost circumference portion and an inner most circumference portion of an area where the first information layer exists.

3. A method for initializing an optical information recording medium by radiating a laser beam,
the recording medium including a substrate and at least a first information layer and a second information layer, the first information layer and the second information layer, on/from which signals can be recorded/reproduced, being formed on the substrate in his order, wherein an area where the first information layer exists and the second information layer does not exist is provided on the substrate,
the laser beam being radiated from a side of the substrate, wherein initialization of the first information layer is started from the area.

4. The method for initializing an optical information recording medium according to claim 3,
with respect to a laser beam having a wavelength of $\lambda_1$ for initializing the first information layer, a reflectance $R_1$(1before) of the first information layer before being initialized, a reflectance $R_1$(1after) of the first information layer after being initialized, a reflectance $R_1$(2before) of the second information layer before being initialized, a reflectance $R_1$(2after) of the second information layer after being initialized, and a transmittance $T_1$(1before) of the first information layer before being initialized satisfy the relationships:

$$R_1(1\text{before}) < R_1(1\text{after}), R_1(1\text{before}) < R_1(2\text{before}) \times [T_1(1\text{before})]^2,$$
$$\text{and } R_1(1\text{before}) < R_1(2\text{after}) \times [T_1(1\text{before})]^2.$$

5. A method for initializing an optical information recording medium by radiating a laser beam,
the recording medium including a substrate and at least a first information layer and a second information layer, the first information layer and the second information layer, on/from which signals can be recorded/reproduced, being formed on the substrate in this order,
the laser beam being radiated from a side of the substrate,
wherein, at least in an area where both the first and second information layers are formed, the first information layer is initialized after the second information layer is initialized,
with respect to a laser beam having a wavelength of $\lambda_1$ for initializing the first information layer, a reflectance $R_1$(1before) of the first information layer before being initialized, a reflectance $R_1$(2before) of the second information layer before being initialized, a reflectance $R_1$(2after) of the second information layer after being initialized, and a transmittance $T_1$(1before) of the first information layer before being initialized, and
with respect to a laser beam having a wavelength of $\lambda_2$ for initializing the second information layer, a reflectance $R_2$(1before) of the first information layer before being initialized, a reflectance $R_2$(2before) of the second information layer before being initialized, and a transmittance $T_2$(1before) of the first information layer before being initialized, satisfy the relationships:

$$R_1(1\text{before}) < R_1(2\text{before}) \times [T_1(1\text{before})]^2, R_1(2\text{before}) > R_1(2\text{after}),$$
$$\text{and } R_2(1\text{before}) < R_2(2\text{before}) \times [T_2(1\text{before})]^2.$$

6. The method for initializing an optical information recording medium according to claim 5,
wherein, with respect to a laser beam having a wavelength of $\lambda_2$ for initializing the second information layer, a transmittance $T_2$(1before) of the first information layer before being initialized and a transmittance $T_2$(1after) of the first information layer after being initialized satisfy the relationship:

$$T_2(1\text{before}) > T_2(1\text{after}).$$

7. The method for initializing an optical information recording medium according to claim 5,
by wherein the wavelength $\lambda_1$ of the laser beam for initializing the first information layer is equal to the wavelength $\lambda_2$ of the laser beam for initializing the second information layer.

8. A method for initializing an optical information recording medium by radiating a laser beam,
the recording medium including a substrate and at least a first information layer and a second information layer, the first information layer and the second information layer, on/from which signals can be recorded/reproduced, being formed on the substrate in this order, wherein an area where the first information layer exists and the second information layer does not exist is provided on the substrate,
the laser beam being radiated from a side of the substrate,
wherein initialization of the first information layer is started from the area, and
the first information layer is initialized after the second information layer is initialized at least in an area where both the first and second information layer are formed.

9. The method for initializing an optical information recording medium according to claim 8,
wherein, with respect to a laser beam having a wavelength of $\lambda_1$ for initializing the first information layer, a reflectance $R_1$(1before) of the first information layer before being initialized, a reflectance $R_1$(1after) of the first information layer after being initialized, a reflectance $R_1$(2before) of the second information layer before being initialized, a reflectance $R_1$(2after) of the second information layer after being initialized, and a transmittance $T_1$(1before) of the first information layer before being initialized, and
with respect to a laser beam having a wavelength of $\lambda_2$ for initializing the second information layer, a transmittance $T_2$(1before) of the first information layer before being initialized and a transmittance $T_2$(1after) of the first information layer after being initialized, satisfy the relationships:

$$R_1(1\text{before}) < R_1(1\text{after}), R_1(1\text{before}) < R_1(2\text{before}) \times [T_1(1\text{before})]^2,$$
$$R_1(1\text{before}) < R_1(2\text{after}) \times [T_1(1\text{before})]^2, \text{ and}$$
$$T_2(1\text{before}) > T_2(1\text{after}).$$

10. The method for initializing an optical information recording medium according to claim 8,
wherein, with respect to a laser beam having a wavelength of $\lambda_1$ for initializing the first information layer, a reflectance $R_1$(1before) of the first information layer before being initialized, a reflectance $R_1$(1after) of the first information layer after being initialized, a reflectance $R_1$(2before) of the second information layer before being initialized, a reflectance $R_1$(2after) of the second information layer after being initialized, and a transmittance $T_1$(1before) of the first information layer before being initialized, and with respect to a laser beam having a wavelength of $\lambda_2$ for initializing the second information layer, a reflectance $R_2$(1before) of the first information layer before being initialized, a reflectance $R_2$(2before) of the second information layer before being initialized, and a transmittance $T_2$(1before) of the first information layer before being initialized, satisfy the relationships:

$R_1(1\text{before}) < R_1(1\text{after})$, $R_1(1\text{before}) < R_1(2\text{before}) \times [T_1(1\text{before})]^2$, $R_1(1\text{before}) < R_1(2\text{after}) \times [T_1(1\text{before})]^2$, $R_1(2\text{before}) > R_1(2\text{after})$, and $R_2(1\text{before}) < R_2(2\text{before}) \times [T_2(1\text{before})]^2$.

11. The method for initial an optical information recording medium according to claim 8, wherein the wavelength $\lambda_1$ of the laser beam for initializing the first information layer is equal to the wavelength $\lambda_2$ of the laser beam for initializing the second information layer.

12. A method for initializing an optical information recording medium, the recording medium including a substrate and at least a first information layer and a second information layer, the fist information layer and the second information layer, on/from which signals can be recorded/reproduced, being formed on the substrate in this order, wherein the first and second information layers are initialized by at least one flash light radiated frown a light source provided on the side of the substrate, and the first and second information layers are initialized at the same time by a flash light radiated once from a light source with emission energy of not less than 1.5 J/cm² and not more than 1.8 J/cm² arranged at a distance of not less than 5 mm and less than 15 mm from the optical information recording medium.

13. The method for initializing an optical information recording medium according to claim 12, wherein the first and second information layers are initialized at the same time by a flash light with an emission time of not more than 200 μs radiated once.

14. The method for initializing an optical information recording medium according to claim 13, wherein the flash light passes through the first information layer at a transmittance of not less than 40% and not more than 70%.

15. The method for initializing an optical information recording medium according to claim 12, wherein a plurality of flash lights are radiated.

16. The method for initializing an optical information recording medium according to claim 15, wherein at least two flash lights that are different in emission energy are radiated.

17. The method for initializing an optical information recording medium according to claim 15, wherein the second information layer is initialized by a first flash light, and then the first information layer is initialized by a second flash light with emission energy lower than that of the first flash light.

18. The method for initializing an optical information recording medium according to claim 17, wherein the optical information recording medium is a disk-shaped optical information recording medium having a radius of not less than 50 mm.

19. The method for initializing an optical information recording medium according to claim 12, wherein the flash light passes through the first information layer at a transmittance of not less than 40% and not more than 70%.

20. A method for initializing an optical information recording medium, the recording medium including a substrate and at least a first information layer and a second information layer, the first information layer and the second information layer, on/from which signals can be recorded/reproduced, being formed on the substrate in this order, wherein the first and second information layers are initialized by at least one flash light radiated from a light source provided on the side of the substrate, the first and second information layers are initialized at the same time by a flash light with an emission time of not more than 200 μs radiated once, and the flash light passes through the first information layer at a transmittance of not less than 40% and not more than 70%.

21. The method for initializing an optical information recording medium according to claim 20, wherein the optical information recording medium is a disk-shaped optical information recording medium having a radius of not less than 50 mm.

22. A method for initializing an optical information recording medium, the recording medium including a substrate and at least a first information layer and a second information layer, the first information layer and the second information layer, on/from which signals can be recorded/reproduced, being formed on the substrate in this order, wherein the first and second information layers are initialized by at least one flash light radiated from a light source provided on the side of the substrate, wherein a plurality of flash lights are radiated, and wherein the second information layer is initialized by a first flash light, and then the first information layer is initialized by a second flash light with emission energy lower than that of the first flash light.

23. The method for initializing an optical information recording medium according to claim 22, wherein the optical information recording medium is a disk-shaped optical information recoding medium having a radius of not less than 50 mm.

* * * * *

UNITED STATES PATENT AND TRADEMARK OFFICE
CERTIFICATE OF CORRECTION

PATENT NO. : 6,807,142 B1
DATED : October 19, 2004
INVENTOR(S) : Nagata et al.

It is certified that error appears in the above-identified patent and that said Letters Patent is hereby corrected as shown below:

Column 20,
Line 58, "bearn" should read -- beam --.

Column 21,
Line 41, "$[T_1(1before)]_2$" should read -- $T_1(1before)]^2$ --.

Column 22,
Line 21, "by wherein" should read -- wherein --.

Column 23,
Line 36, "frown" should read -- from --.

Signed and Sealed this

Twenty-second Day of November, 2005

JON W. DUDAS
*Director of the United States Patent and Trademark Office*